United States Patent
Shimbo

(10) Patent No.: US 6,294,035 B1
(45) Date of Patent: Sep. 25, 2001

(54) METHOD OF FABRICATING THIN-SHEET-COATED COMPOSITE SUBSTRATE

(75) Inventor: Tomohiro Shimbo, Tokyo-To (JP)

(73) Assignee: Dai Nippon Printing Co., Ltd. (JP)

(*) Notice: Subject to any disclaimer, the term of this patent is extended or adjusted under 35 U.S.C. 154(b) by 0 days.

(21) Appl. No.: 09/449,571

(22) Filed: Nov. 29, 1999

(30) Foreign Application Priority Data

Nov. 30, 1998 (JP) .................................. 10-340275

(51) Int. Cl.[7] .............................. B32B 31/16; B05D 3/12; B05C 11/08
(52) U.S. Cl. ..................... 156/74; 156/105; 156/275.7; 156/285; 118/52; 427/240; 269/20; 269/305
(58) Field of Search .................. 156/74, 99, 100, 156/105, 273.7, 275.5, 285, 275.7; 118/52; 427/240; 269/20, 21, 23, 303, 305

(56) References Cited

U.S. PATENT DOCUMENTS 5,744,193 * 4/1998 Kitano ..................................... 156/74

FOREIGN PATENT DOCUMENTS 55-68040    5/1980 (JP) .

* cited by examiner

Primary Examiner—Michael W. Ball
Assistant Examiner—Michael A. Tolin
(74) Attorney, Agent, or Firm—Parkhurst & Wendel, L.L.P.

(57) ABSTRACT

A method of fabricating a thin-sheet-coated composite substrate bonds together a thin sheet and a substrate which unavoidably has an irregular thickness with an adhesive so that the outer surface of the thin sheet has the highest possible flatness. A surface plate having a flat surface of high flatness is held by a chuck included in a spinner with the flat surface facing upward. The thin sheet is placed on the surface plate in close contact with the flat surface of the surface plate. A liquid adhesive is dropped on the thin sheet and the substrate is placed on the adhesive. The chuck is rotated at high rotational speed to spread the adhesive in the space between the thin sheet and the substrate and to remove a surplus portion of the adhesive from the space between the thin sheet and the substrate by centrifugal force.

7 Claims, 2 Drawing Sheets

METHOD OF FABRICATING THIN-SHEET-COATED COMPOSITE SUBSTRATE

BACKGROUND OF THE INVENTION

1. Field of the Invention

The present invention relates to a method of fabricating a thin-sheet-coated composite substrate that fabricates a thin-sheet-coated composite substrate by bonding a thin sheet or a film, such as a thin glass sheet, to a substrate formed by laminating optical films or the like with an adhesive and, more particularly, to a method of fabricating a thin-sheet-coated composite substrate having a thin sheet having an improved flatness.

2. Description of the Related Art

Functional substrates coated with a thin glass sheet are employed in electronic parts and optical parts. A conventional method of fabricating a thin-sheet-coated composite substrate superposes a substrate and a thin sheet with an adhesive placed between the substrate and the thin sheet to form a layered structure, holds the layered structure between a pair of highly flat pressure plates, and compresses the layered structure so that the adhesive is spread in an adhesive layer of a predetermined thickness, and then cures the adhesive layer. When the layered structure is compressed between the pressure plates, the adhesive is squeezed out of the space between the substrate and the thin sheet. The squeezed adhesive spreads over portions not to be coated with the adhesive of the substrate, and the thin sheet, and the pressure plates are smeared with the adhesive. Therefore, the pressure plates must be cleaned to remove the adhesive before using the same again. This method is unable to adjust the thickness of the adhesive layer in a satisfactory accuracy and has a difficulty in applying a fixed pressure uniformly to the layered structure in case that the substrate is larger than the thin sheet. Since the layered structure is compressed between the pressure plates, the components of the layered structure are firmly bonded together and it is difficult to separate the bonded components.

A method proposed in JP-A 55-68040 comprises the steps of supporting a substrate by a vacuum chuck on a spinner, dripping a liquid adhesive onto the substrate, putting a thin glass sheet on the adhesive, blowing air against the thin glass sheet to spread the adhesive in an adhesive layer over the entire surface of the substrate, driving the spinner to rotate the substrate so that a surplus portion of the adhesive is scattered and the substrate and the thin glass sheet are bonded firmly together to form a composite substrate, and removing the composite substrate from the vacuum chuck.

Although this previously proposed method eliminated drawbacks in the conventional techniques to a considerable extent, this method has a drawback that the flatness of the thin glass sheet of the composite substrate fabricated by this method is unsatisfactory. The substrate has an irregular thickness and does not have satisfactory flatness unless the substrate is finished by polishing. When a thin glass sheet is attached to the surface of a substrate having an irregular thickness or to a layer formed on such a substrate, the surface of the thin glass sheet reflects the irregular shape of the surface of the substrate underlying the thin glass sheet.

SUMMARY OF THE INVENTION

Accordingly, it is an object of the present invention to provide a method of fabricating a thin-sheet-coated substrate comprising a substrate and a thin sheet laminated to the substrate, capable of reducing irregularities in the surface of the thin sheet laminated to the substrate which unavoidably has an irregular surface to the least possible extent.

According to the present invention, a thin plate is placed under a substrate. If the thin plate is held by a pneumatic chuck, the thin sheet will be bent or broken. The present invention places a thin sheet on a surface plate fixedly held by a pneumatic chuck or the like in close contact with a surface of the surface plate to keep the thin sheet flat, forms an adhesive layer over the upper surface of the thin sheet and bonds the substrate to the thin sheet with the adhesive layer. Thus, the present invention eliminates the serious drawback of the prior art method.

According to the present invention, a thin-sheet-coated composite substrate fabricating method comprises the sequential steps of: fixing a surface plate having a flat surface of a high flatness to a workpiece holding chuck included in a rotary coating machine with the flat surface facing upward; placing a thin sheet on the surface plate in close contact with the flat surface; dropping a liquid adhesive onto the thin sheet; placing a substrate on the surface of the thin sheet wetted by the liquid adhesive; and rotating the chuck to remove a surplus portion of the liquid adhesive.

Since the flatness of the thin sheet is corrected by the highly flat surface of the surface plate, the substrate can be coated with the thin sheet having a high flatness.

In this method of fabricating a thin-sheet-coated composite substrate, the adhesive may be curable, and a curing step of curing the adhesive may be performed after the completion of the step of rotating the chuck to scatter a surplus portion of the liquid adhesive.

Since the adhesive is cured, the flatness of the surface of the composite substrate formed by laminating the thin sheet to the substrate can be stably maintained.

In this method of fabricating a thin-sheet-coated composite substrate, the adhesive may be an ionizing-radiation-curable adhesive, and the curing step may employ an ionizing radiation.

Since the adhesive is ionizing-radiation-curable and can be cured in a very short time by irradiating the adhesive with the ionizing radiation, the corrected flatness of the thin sheet cannot deteriorate even if stress induced in the thin sheet when correcting the flatness remains in the thin sheet because the adhesive is cured.

In this method of fabricating a thin-sheet-coated composite substrate, a liquid layer may be formed between the surface plate and the thin sheet in the step of placing the thin sheet on the surface plate in close contact with the flat surface.

The liquid facilitates holding the thin sheet in close contact with the surface plate.

In this method of fabricating a thin-sheet-coated composite substrate, air may be blown against the thin sheet placed on the surface plate from the side of the thin sheet in the step of placing the thin sheet on the surface plate in close contact with the flat surface.

The thin sheet can be surely brought in close contact with the surface plate without touching the thin sheet.

The above and other objects, features and advantages of the present invention will become more apparent from the following description taken in connection with the accompanying drawings.

DESCRIPTION OF THE PREFERRED EMBODIMENTS

A thin-sheet-coated composite substrate fabricating method embodying the present invention employs a rotary coating machine commonly called a spin coater for adhesive application. The spin coater comprises a spindle, and a pneumatic chuck attached to one end of the spindle to hold a workpiece fixedly thereon. A coating liquid is stored in a pressurized tank. A fixed quantity of the coating liquid is discharged from the tank and dropped onto the workpiece by properly controlling the time of opening of a solenoid valve. The spindle is driven for high-speed rotation to spread the coating liquid over the surface of the workpiece by centrifugal force. The spin coater is suitable for coating a relatively small, plate-shaped workpiece with a coating liquid and is used for applying a resist to a workpiece in fabricating electronic parts. The present invention utilizes the spin coater not only for adhesive application but also for laminating thin sheets and for adjusting the thickness of a layer of an adhesive.

Figure 1:
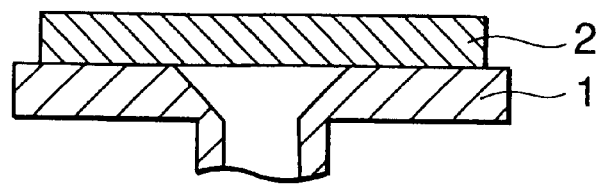
FIG. 1 is a sectional view showing a state in which a surface plate is fixed to a pneumatic chuck.

Referring to FIG. 1, a surface plate 2 is fixed to a pneumatic chuck 1 included in a rotary coating machine. The pneumatic chuck 1 has a support table formed of aluminum or the like. The surface plate 2 may be held fixedly on a mechanical chuck instead of holding the same on the pneumatic chuck 1 by suction.

Desirably, a support surface of the surface plate 2, i.e., a surface opposite a surface of the same seated on the pneumatic chuck 1, has a flatness not greater than 0.5 μm. The surface plate 2 may be formed of, for example, quartz glass. When the support surface of the surface plate 2 has such a high flatness, a thin sheet 3 can be held on the surface plate 2 in close contact with the support surface without forming any gap between the support surface of the surface plate 2 and the thin sheet 3. Therefore, the thin sheet 3 can be kept in close contact with the support surface of the surface plate 2 without applying a suction to the thin sheet 3. Thus, the highly flat support surface of the support plate 2 is effective not only in forming a thin-sheet-coated composite substrate having a highly flat surface but also in keeping the thin-sheet in close contact with the support surface of the surface plate 2. Since nothing but the surface plate 2 is in contact with the thin sheet 3, any undesirable stress is not induced in the thin sheet 3 while the thin sheet 3 is rotated, and the thin sheet 3 can be stably rotated.

Although it is not true that any consideration is not given to the flatness of the support surface of the conventional pneumatic chuck, it is possible, because the support surface of the pneumatic chuck is provided with a suction opening, that a portion of the workpiece is pulled toward the suction opening by suction and the workpiece is deformed in a downward convex shape. Therefore, the present invention holds the rigid surface plate 2 fixedly on the pneumatic chuck 1, and uses the support surface of the surface plate 2 not provided with any suction hole for holding the thin sheet 3.

Figure 2:
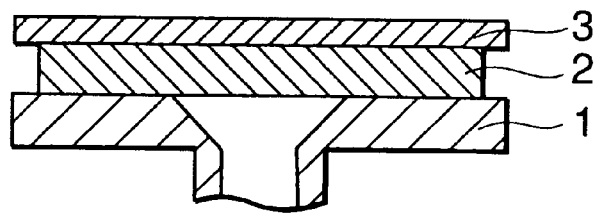
FIG. 2 is a sectional view showing a state in which a thin sheet is placed in close contact with the surface plate.

The surface plate 2 has a size large enough to support the thin plate 3 thereon. It is preferable that the surface plate 2 is one size smaller than the thin sheet 3 as shown in FIG. 2 because it is possible to avoid the adhesion of adhesive dropped onto the thin sheet 3, scattered around when the pneumatic chuck 1 of the rotary coating machine holding the surface plate 2 is rotated and spread on the back surface of a peripheral portion of the thin sheet 3 to the surface plate 2, and work for cleaning the surface plate 2 smeared with the adhesive can be omitted when the surface plate 2 is one size smaller than the thin sheet 3. If the surface plate 2 is excessively small, the ability of the surface plate 2 to firmly support the thin sheet 3 is insufficient and it is possible that a free portion of the thin sheet 3 extending beyond the edge of the surface plate 2 warps to deteriorate the flatness of the thin sheet 3. Preferably, the size of the surface plate 2 is 60 to 90% of the size of the thin sheet 3. The surface plate 2 must be thick enough not to be bent when chucked by the pneumatic chuck 1. For example, when the thin sheet 3 is a thin glass sheet with dimensions 65 mm×65 mm×100 μm (thickness), suitable size of the surface plate 2 is 53 mm×53 mm×6 mm. Incidentally, the size of the substrate 5 (FIG. 3) to be bonded to the thin sheet 3 is 63.5 mm×63.5 mm×1.1 mm.

Referring to FIG. 2, the thin sheet 3 is supported on the surface plate 2 in close contact with the support surface of the surface plate 2. Desirably, pressure is applied to the thin sheet 3 to bring the thin sheet 3 into close contact with the support surface of the surface plate 2 by (1) placing a heavy thing on the thin sheet 3, (2) applying a pressure by a pressing means or (3) blowing air against the thin sheet 3 by an air blower. Among these methods, the air blowing method (3) is most advantageously used because this method produces pressure without direct contact. The thin sheet 3 can be easily kept in close contact with the support surface of the surface plate by forming a thin film of a solvent, such as xylene, or a liquid, such as pure water between the surface plate 2 and the thin sheet 3. If a liquid is used to hold the thin sheet 3 in close contact with the support surface of the surface plate 2, a thin-sheet-coated composite substrate formed by bonding together the thin sheet 3 and the substrate 5 must be cleared of the liquid by drying and cleaning.

Since the support surface of the surface plate 2 is highly flat, the surface of the thin sheet 3 in contact with the support surface of the surface plate 2 is corrected and flattened in the same flatness as the support surface of the surface plate 2 even if the thin sheet has an irregular thickness or is warped slightly.

As mentioned above, the conventional thin-sheet-coated composite substrate fabricating method fixes a substrate thicker than a thin sheet to the vacuum chuck, because it is natural to place the substrate to be coated with the thin sheet under the thin sheet and it is possible that the thin sheet is broken by the operation for mounting the thin sheet on the vacuum chuck and the subsequent application of suction to the thin sheet.

The closeness of contact of the thin sheet with the support surface of the surface plate 2 is enhanced when the thin sheet is electrically charged, thereby enhancing the reliability of chucking. However, the charged thin sheet attracts dust particles, and the dust particle sticking to the thin sheet will affect adversely to electronic parts. Therefore, it is preferable to eliminate electric charges from the thin sheet before using a thin-sheet-coated composite substrate employing the thin sheet for fabricating an electronic part.

Figure 3:
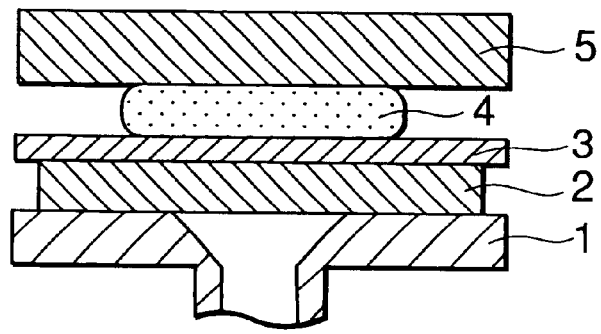
FIG. 3 is a sectional view showing a state in which an adhesive has been dropped on the thin sheet and a substrate is placed on the adhesive.

Referring to FIG. 3, a liquid adhesive 4 is dropped onto the surface of the thin sheet 3 and the substrate 5 to be bonded to the thin sheet 3 is placed on the liquid adhesive 4. Discharge conditions are set to discharge the liquid adhesive from a dispenser or the like in a manner to drop a sufficient but not excessive amount of the liquid adhesive 4 onto the thin sheet 3. The liquid adhesive 4 carefully to avoid formation of bubbles in the liquid adhesive 4. The liquid adhesive 4 is spread slightly by the weight of the substrate 5 in a shape dependent on the quantity of the liquid adhesive 4 dropped onto the thin sheet 3 as shown in FIG. 3. Subsequently, the spinner is rotated at a high rotating speed to spread the liquid adhesive 4 to the periphery of the gap between the thin sheet 3 and the substrate 5. Consequently, the thickness of the liquid adhesive 4 decreases, a surplus amount of the liquid adhesive 4 is squeezed out of the gap, and the surplus amount of the liquid adhesive 4 is scattered by centrifugal force.

Figure 4:
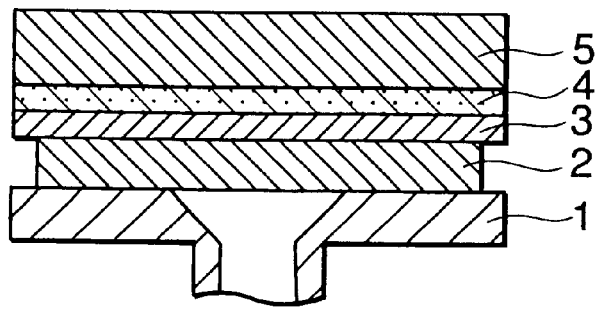
FIG. 4 is a sectional view showing a state in which the thin sheet has been laminated to the substrate.

The thickness of layer of the liquid adhesive 4 formed between the thin sheet 3 and the substrate 5 is adjusted by properly adjusting the viscosity of the liquid adhesive 4, the rotating speed of the spinner and the time for which the spinner is rotated. Thus, the substrate 5 is bonded to the thin sheet 3 with the liquid adhesive 4 as shown in FIG. 4.

Figure 5:
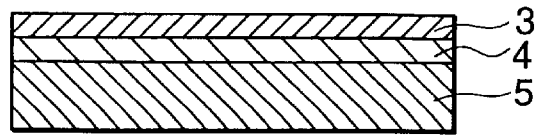
FIG. 5 is a sectional view of a thin-sheet-coated composite substrate fabricated by a method of fabricating a thin-sheet-coated composite substrate in a preferred embodiment of the present invention.

After stopping the spinner or by rotating the spinner at a low rotational speed after rotating the same at a high rotational speed for a predetermined time, the adhesive is heated by a heater or with hot air when the adhesive 4 is of a thermosetting type, the adhesive 4 is irradiated with an ionizing radiation, such as electron beams or ultraviolet rays, for curing when the adhesive 4 is of an ionizing-radiation-curable type. It is desirable to use an ionizing-radiation-curable adhesive and to cure the adhesive perfectly by irradiation with an ionizing radiation. FIG. 5 shows a thin-sheet-coated composite substrate formed by thus bonding together the thin sheet 3 and the substrate 5. The thin-sheet-coated composite substrate needs to be separated from the surface plate 2 in a subsequent process.

Figure 6:
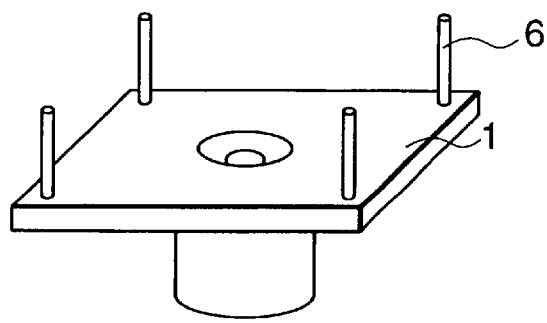
FIG. 6 is a perspective view of another pneumatic chuck which can be used by the thin-sheet-coated composite substrate fabricating method of the present invention.
Figure 7:
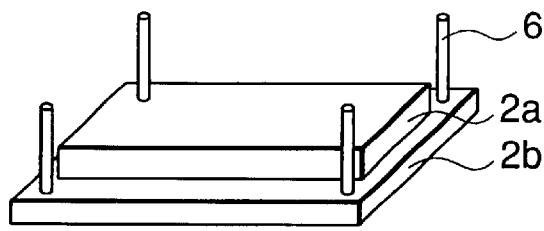
FIG. 7 is a perspective view of another surface plate which can be used by the thin-sheet-coated composite substrate fabricating method of the present invention.

It is rarely possible that the thin-sheet-coated composite substrate laterally shifts and comes off the surface plate 2, the surface plate 2 laterally shifts and comes off the shuck 1, or the thin-sheet-coated composite substrate or the surface plate 2 breaks. It is therefore preferable to set up upstanding pins 6 in the four corners of the chuck 1 as shown in FIG. 6 to prevent accidents. It is preferable to set up the pins 6 in the corners of the chuck 1 when the surface plate 2 is smaller than the thin sheet 3 because there is not any space available for setting up the pins 6 on the surface plate 2. When the surface plate 2 is greater than the thin sheet 3, the pins 6 may be set up on the surface plate 2. When the surface plate 2 must be smaller than the thin sheet 3, a surface plate 2 having a large lower stage 2b greater than the thin sheet 3, and a small upper stage 2a smaller than the thin sheet 3 as shown in FIG. 7 may be used, and the pins 6 may be set up in the corners of the large lower stage 2b. The upper stage 2a may be formed integrally with the lower stage 2b, or the upper stage 2a and the lower stage 2b may be formed separately and bonded together with an adhesive or the like.

Figure 8:
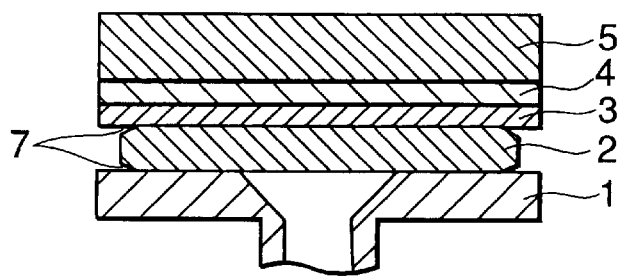
FIG. 8 is a sectional view of a thin-sheet-coated composite substrate formed on a chamfered surface plate.
Figure 9:
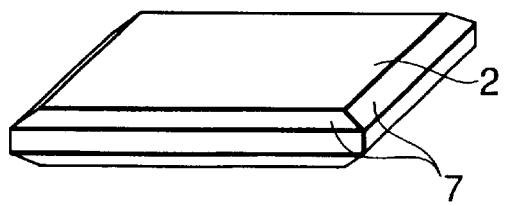
FIG. 9 is a perspective view of the chamfered surface plate shown in FIG. 8.

After the thin-sheet-coated composite substrate has been completed with the adhesive cured, the thin-sheet-coated composite substrate may be separated from the surface plate 2 with a separating tool, such as a plastic spatula or by blowing air against the thin-sheet-coated composite substrate. The thin-sheet-coated composite substrate can be easily separated from the surface plate 2 when the edges of the upper surface of the surface plate are chamfered to form beveled edges 7 as shown in FIG. 8.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of fabricating a thin-sheet-coated composite substrate, comprising the sequential steps of:
   fixing a surface plate having a flat surface of a high flatness to a workpiece holding chuck on a rotary coating machine with the flat surface facing upward;
   placing a thin sheet on the surface plate in close contact with the flat surface;
   dropping a liquid adhesive onto the thin sheet;
   placing a substrate on the surface of the thin sheet wetted with the liquid adhesive; and
   rotating the chuck to remove a surplus portion of the liquid adhesive.

2. The method of fabricating a thin-sheet-coated composite substrate according to claim 1, wherein the adhesive is curable, and a curing step of curing the adhesive is performed after the completion of the step of rotating the chuck to remove a surplus portion of the liquid adhesive.

3. The method of fabricating a thin-sheet-coated composite substrate according to claim 2, wherein the adhesive is an ionizing-radiation-curable adhesive, and the curing step employs ionizing radiation.

4. The method of fabricating a thin-sheet-coated composite substrate according to claim 1, wherein a liquid layer is formed between the surface plate and the thin sheet in the step of placing the thin sheet on the surface plate in close contact with the flat surface.

5. The method of fabricating a thin-sheet-coated composite substrate according to claim 1, wherein air is blown against the thin sheet placed on the surface plate in the step of placing the thin sheet on the surface plate in close contact with the flat surface.

6. The method of fabricating a thin-sheet-coated composite substrate according to claim 1, wherein lateral shifting movement of the surface plate and/or the substrate relative to the workpiece holding chuck is prevented by upstanding pins on the holding chuck.

7. The method of fabricating a thin-sheet-coated composite substrate according to claim 1, wherein lateral shifting movement of the substrate relative to the surface plate is prevented by upstanding pins on the surface plate.

\* \* \* \* \*